Patented May 29, 1923.

1,457,030

UNITED STATES PATENT OFFICE.

INGENUIN HECHENBLEIKNER AND FRANK J. BARTHOLOMEW, OF CHARLOTTE, NORTH CAROLINA, ASSIGNORS TO CHEMICAL CONSTRUCTION COMPANY, OF NEW YORK, N. Y., A CORPORATION OF NORTH CAROLINA.

METHOD OF TREATING SLUDGE ACIDS AND SEPARATED SLUDGE ACIDS.

No Drawing.    Application filed June 15, 1922.    Serial No. 568,629.

*To all whom it may concern:*

Be it known that we, INGENUIN HECHENBLEIKNER and FRANK J. BARTHOLOMEW, citizens of the United States, and residents of Charlotte, in the county of Mecklenburg and State of North Carolina, have invented certain new and useful Improvements in Methods of Treating Sludge Acids and Separated Sludge Acids, of which the following is a specification.

This invention relates to a method of treating acid, and more particularly to a method for reclaiming or recovering sludge acids or separated sludge acids obtained in the refining of petroleum oils or their fractional distillates, and has special reference to a process for concentrating and purifying the sludge or petroleum acids to render the same suitable for further use.

As it well known, crude petroleum oil or its fractional distillates is refined by subjecting the same to the action of sulphuric acid, so that the latter will absorb the heavy hydrocarbons and other undesirable elements present in the crude oil. In practice this sulphuric acid so used has an initial strength of about 66 degrees Baumé or stronger, but at the completion of the operation and after the refined oil has been separated, there remains a sludge or waste acid which contains the impurities removed from the oil and which is of a reduced strength, usually about 50 degrees Baumé, due to the fact that the acid has absorbed a certain amount of water or has given up some of the $SO_3$ content during the refining process. This sludge acid is generally then subjected to further dilution with steam and water in the operation of recovering such oil as may remain therein, and for the purpose of relieving the acid as much as possible of its absorbed impurities. This treatment results in the separation of the sludge acid into an oil which rises to the top and an impure separated sludge acid which settles at the bottom. The separated sludge acid is reduced in strength as a result of this treatment, and usually is about 30 degrees Baumé, and some acids, notably those obtained in the treatment of the more asphaltic base oils, such for example as the California oils, are separated out in this treatment with a reduced strength of about 46 to 48 degrees Baumé. In order to reclaim or recover the sulphuric acid from this dilute and impure separated sludge acid, it is not only necessary to concentrate the acid for the purpose of eliminating the water and thereby raising or restoring the acid to its efficient working strength of 66 degrees Baumé, but it is further required that the undesirable hydrocarbons, which are mainly in the form of tars, asphalts, paraffines, and other unsaturated hydrocarbons, be broken up, driven off, and otherwise eliminated.

Recently a method has been evolved as disclosed in the application of Hechenbleikner and Oliver Ser. No. 477,936, filed June 16, 1921, in which the separated sludge acid is treated in two stages for concentrating and purifying the same, hot air or hot gases being preferably bubbled through bodies of the acid in both stages of this treatment to effect the concentration and purification. As described in said application, the heating of the acid in the first stage is carried on to effect concentration to an intermediate strength, preferably below the point called the "coking or charring point," when the hydrocarbons in the acid begin to char and coke, this so that the impurities in the sludge acid are more effectively eliminated, after which the partially concentrated and purified acid is subjected to heat in the second stage to complete the concentration of the acid. The present invention relates to improvements in this method of concentrating and purifying the sludge acids or separated sludge acids.

More particularly, we have found that a purer and a higher degree of strength of acid may be obtained by this two-stage treatment by modifying the first stage treatment and by treating the acid after this first stage so that the hydrocarbon impurities therein may be conditioned for economical mechanical removal. If the treatment of the acid in the first stage is carried on at an acid strength at or about the so-called "coking" point, the hydrocarbons in the acid char or coke, forming relatively large lumps which are not driven off and eliminated during the heating treatments and which remain in the resultant acid and which must be removed therefrom as by skimming, this involving an uneconomical method of separation. In order to avoid coking and the necessity for skimming, we have previously carried on the first concentrating treatment below the charring or coking point, as described in the application of Hechenbleikner and Oliver Ser. No. 477,936 above mentioned, the hydrocarbons being by this treatment very largely volatilized, oxidized or otherwise eliminated. After further experimentation, we have discovered that if the concentration in the first stage is carried on above the coking point and in the coking region, that the hydrocarbons will not separate out in large particles, but will remain unseparated and will stay in a finely divided condition in the acid. If this concentration is done in pans, the carbon separates out as tar or coke in large lumps and skimming must be resorted to. With our present first stage treatment, the impurities are on the contrary in an unseparated and finely divided condition in the acid. We have further found that when such a concentrated acid having the carbon impurities in a finely divided condition therein is diluted, that the carbonaceous impurities form themselves into suitable crystals or assume a mechanical condition suitable for economical mechanical separation, the impure diluted acid being thus capable, for example, of quick filtration for obtaining the purified acid. We have found, moreover, that after this dilution and removal of impurities, that reconcentration of the acid will produce a product which has less contamination than the acids treated by prior methods, and which may be concentrated to a higher degree of strength, as for example 97%. The present invention, therefore, more particularly relates to a method of this nature in which the sludge acid or separated sludge acid may be purified and concentrated to high degrees, by first concentrating the acid while preventing or avoiding mechanical separation of the carbon impurities therein, by then diluting the acid to effect separation of the impurities or condition the same for effective and economical mechanical removal and then reconcentrating the acid.

The invention consists in the process and steps hereinafter particularly described and sought to be defined in the appended claims.

In the practice of our method, the sludge acid or the separated sludge acid is subjected to two stages of concentration and an intermediate stage of dilution and separation. In the first concentrating stage the weak separated sludge acid or the slude acid is first collected in a body or bath and is heated and agitated to effect a partial concentration thereof, this heating and agitating being preferably carried out by means of bubbling hot air or hot gases through the body of acid. The hot air or hot gases issuing or existing from the bath of acid is or are utilized for preheating the weak acid which is fed into the bath, a preheating tower communicating with the bath being provided for this purpose. The acid in this bath is concentrated up to an intermediate strength, and preferably the concentration is carried on in the coking range of the acid, this concentration taking place at temperatures substantially below the true boiling point of the acid. The coking range of an acid varies with the different sludge acids used, this varying according to the type of crude oils refined and also according to the method used in refining them. The point at which the charring or coking of an acid begins to take place may be as low as 47 degrees Baumé and as high as 57 degrees Baumé. In any given type of sludge acid, however, the coking or charring point of the acid, that is the point at which coking or charring of the hydrocarbons begins to take place, is a determinable and therefore a definite quantity. In the practice of the present method, the first heating stage is carried on preferably above the coking point and in the coking range of the acid, and thus somewhat above the point at which the hydrocarbons begin to char. After this treatment the hydrocarbon impurities which have not been volatilized or driven off are present in the acid, not in separated lumps but in a state of suspension and in an unseparated condition. In this condition, mechanical removal of the impurities is, however, as a practical matter, unfeasible.

We have further found, however, that if the partially concentrated sludge acid after this first stage treatment is diluted with water, for example, that the hydrocarbon impurities therein separate out and form themselves in or assume a mechanical condition suitable for mechanical separation or removal, and that the impurities may be removed from the acid as by permitting the impurities to settle out, or by filtering the diluted acid. The filtering step is the preferred step of mechanically eliminating the impurities, since this involves the provision of less floor space, less tankage investment, and is considerably faster and thus economical in time. The acid obtained after the first stage treatment is therefore filtered, as by means of a sand filter, for example, the filtrate comprising a diluted sulphuric acid which is transparent and clear enough to be concentrated to very high strengths, as for example to 97 or 97½%, which is impossible in other known methods. Moreover, the filtrate so obtained contains a minimum amount of hydrocarbon impurities, the acid obtained being capable of concentration to a high state of purity.

The carbonaceous material separated or removed from the diluted acid by the filtering step is saved and utilized as a fuel, these carbonaceous impurities thus constituting a by-product of this method.

After the diluting and purifying treatment, the diluted and purified acid is then concentrated by the second heating stage, a body of the acid being preferably collected in a bath similar to the treatment in the first stage, hot air or hot gases under pressure being bubbled through the acid for effecting the heating and concentrating thereof. The spent gases exiting from the bath are also here utilized preferably for preheating the incoming weak feed acid fed into the bath, a preheating tower being also employed to this end. The second stage of heat treatment is carried on to effect full or complete concentration of the acid to 66 degrees Baumé and up to 97% strength. Although we prefer to carry on the second stage treatment in this manner, we desire it to be understood that the purified acid obtained after the first stage of concentration, dilution and separation may be concentrated in any well known manner.

As an example of our present method, the following may be cited:

1. A separated sludge acid which has been diluted down to 30 to 35 degrees Baumé is concentrated in the first stage treatment to about 61 to 63 degrees Baumé if the coking or charring point of this acid is about 57 degrees Baumé. For effecting the concentration to this strength the temperature of this bath is controlled and kept at about 320 degrees F.

2. The thus concentrated acid is then diluted to a strength where the carbonaceous materials separate out to best advantage, which dilution may be carried on to about 40 degrees Baumé. The dilution may be effected with water. The carbon impurities separate out in granules or crystals and assume the desired mechanical condition suitable for separation or removal.

3. This diluted sludge acid is then preferably filtered and the filtrate is now ready for the next concentrating step, the separated carbon impurities being removed from the filter and used for fuel purposes.

4. The dilute and purified acid obtained after the filtering step is then concentrated as for example in the second bath up to the desired strength of 66 degrees Baumé or over.

It has been found that this described method is equally applicable to the acids obtained from treating the Western type of oils, as for example the California oils, and that such acids separated at substantially 50 degrees Baumé can be treated with equal efficiency by the present process. It has been further found that where the usual separation of the acid is not carried out to obtain a maximum separation of the oils, that the present method may be used to great advantage and with efficiency and economy.

The practice of our method will in the main be apparent from the above detailed description thereof. It will be further apparent that by our present method a sludge acid or separated sludge acid may be reclaimed in a high state of purity and strength in an economical manner, the carbonaceous material being also reclaimable for further fuel purposes.

While we have described our method and given examples of the preferred practice thereof, it will be apparent that many changes in the steps may be made without departing from the spirit of the invention defined in the following claims.

We claim:

1. The method of treating sludge acids or separated sludge acids which consists in first internally heating the sludge acid or separated sludge acid to concentrate the same while preventing or avoiding mechanical separation of the carbon impurities therein, in then diluting the same to effect separation of the impurities and removing the impurities therefrom, and in thereafter heating the same for effecting concentration thereof.

2. The method of treating sludge acids or separated sludge acids which consists in first internally heating the sludge acid or separated sludge acid to effect concentration of the same to an intermediate strength while retaining the carbon impurities in a state of suspension therein, in then diluting the same to effect separation of the impurities and removing the impurities therefrom, and in thereafter heating the same for effecting complete concentration thereof.

3. The method of treating sludge acids or separated sludge acids which consists in first internally heating the sludge acid or separated sludge acid to effect concentration thereof to a strength substantially in the coking range of the acid, in then diluting the same and removing impurities therefrom, and in thereafter further heating the same to effect concentration thereof.

4. The method of treating sludge acids or separated sludge acids which consists in first internally heating the sludge acid or separated sludge acid to effect concentration thereof while retaining the carbon impurities in a state of suspension therein, in then diluting the same to effect separation of the impurities and filtering the acid to remove impurities therefrom, and in thereafter further heating the acid for effecting concentration thereof.

5. The method of treating sludge acids or separated sludge acids which consists in first passing hot air or gas through the acid for effecting concentration thereof, in then diluting the same and removing impurities therefrom, and in thereafter heating the same to effect concentration thereof.

6. The method of treating sludge acids or separated sludge acids which consists in passing hot air or gas through the acid for effecting concentration thereof to an intermediate strength, in then diluting the concentrated acid and removing impurities therefrom, and in thereafter heating the acid for effecting complete concentration thereof.

7. The method of treating sludge acids or separated sludge acids which consists in first passing hot air or gas through the acid to concentrate the same to a strength substantially in the coking range of the acid, in then diluting the same and removing impurities therefrom, and in thereafter heating the so-treated acid to effect concentration thereof.

8. The method of treating sludge acids or separated sludge acids which consists in blowing hot air or gas through a body of the acid to effect a concentration thereof, in then diluting the same and removing impurities therefrom, and in thereafter heating the so treated acid to concentrate the same.

9. The method of treating sludge acids or separated sludge acids which consists in first blowing hot air or gas through a body of the acid to effect concentration of the same to an intermediate strength, in then diluting the acid and removing impurities therefrom, and in thereafter heating the acid to effect full concentration thereof.

10. The method of treating sludge acids or separated sludge acids, which consists in first passing hot air or gas through the sludge acid or separated sludge acid to concentrate the same, in then diluting the same and removing impurities therefrom, and in thereafter passing hot air or gas through the so treated acid to concentrate the same.

11. The method of treating sludge acids or separated sludge acids which consists in first passing hot air or gas through the acid to concentrate the same to a strength substantially in the coking range of the same, in then diluting the same and removing impurities therefrom, and in thereafter passing hot air or gas through the so treated acid to effect full concentration thereof.

12. The method of treating sludge acids and separated sludge acids, which consists in first bubbling hot air or gas through a body of the acid to effect concentration of the same to an intermediate strength, in then diluting the so treated acid and removing impurities therefrom, and in thereafter bubbling hot air or gas through a body of the diluted acid for effecting concentration thereof.

13. In the method of treating sludge acids or separated sludge acids, the steps which consist in first internally heating the sludge acid or separated sludge acid to effect a concentration thereof while preventing mechanical separation of the carbon impurities therein and in then diluting the so treated acid to effect separation of the impurities and removing the impurities therefrom.

14. In the method of treating sludge acids or separated sludge acids, the steps which consist in first internally heating the sludge acid or separated sludge acid to effect concentration thereof to an intermediate strength while retaining the carbon impurities in a state of suspension therein, and in then diluting the same for effecting separation of the impurities and removing the impurities therefrom.

15. In the method of treating sludge acids or separated sludge acids, the steps which consist in first passing hot air or gas through a body of the acid to concentrate the same, and then diluting the so treated acid and removing impurities therefrom.

Signed at Charlotte, in the county of Mecklenburg, and State of North Carolina, this 22nd day of May, A. D. 1922.

INGENUIN HECHENBLEIKNER.
FRANK J. BARTHOLOMEW.